No. 804,335. PATENTED NOV. 14, 1905.
F. L. NOVOTNY.
WEEDER OR CULTIVATOR.
APPLICATION FILED JUNE 29, 1904. RENEWED APR. 12, 1905.
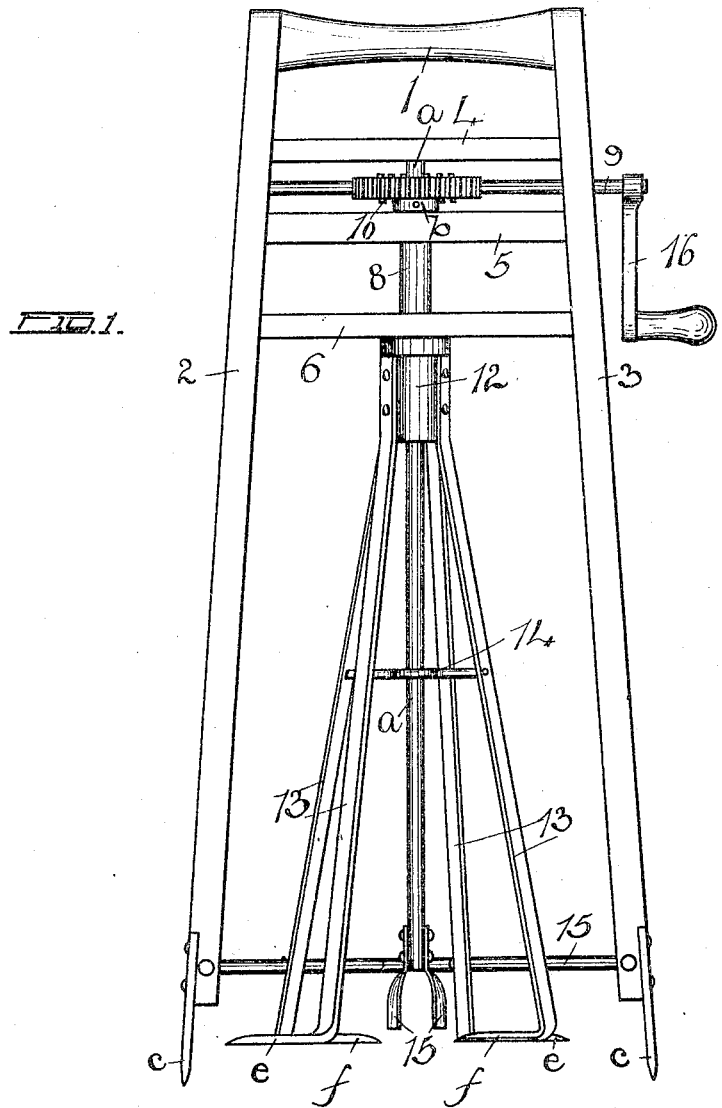
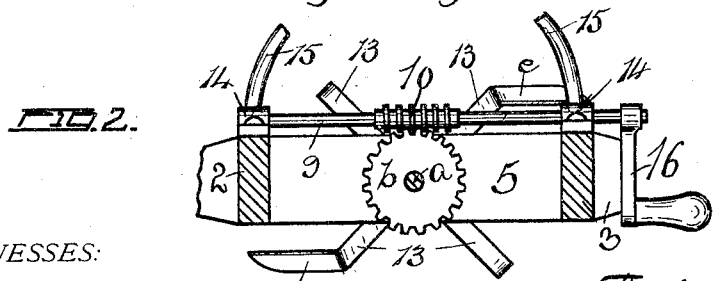
WITNESSES:
INVENTOR:

UNITED STATES PATENT OFFICE.

FREDERICK L. NOVOTNY, OF RUSHVILLE, NEBRASKA.

WEEDER OR CULTIVATOR.

No. 804,335.          Specification of Letters Patent.          Patented Nov. 14, 1905.

Application filed June 29, 1904. Renewed April 12, 1905. Serial No. 255,235.

*To all whom it may concern:*

Be it known that I, FREDERICK L. NOVOTNY, residing at Rushville, in the county of Sheridan and State of Nebraska, have invented certain useful Improvements in Weeders or Cultivators; and I do hereby declare that the following is a full, clear, and exact description of the invention, such as will enable others skilled in the art to which it appertains to make and use the same, reference being had to the accompanying drawings, which form a part of this specification.

This invention relates to a new and novel improvement in cultivators.

The aim of my invention is to provide a cultivator by means of which individual plants may be cultivated and thinned out, and my invention is especially adapted to be used in connection with beet cultivation.

In the accompanying drawings I have shown in Figure 1 an elevation of a cultivator embodying my invention, while Fig. 2 shows a sectional view thereof with portions broken away.

It has been set forth the aim of my invention is to provide a cultivator by means of which an operator may go through the field and cultivate as well as thin out certain plants, and in carrying out the aim of my invention I provide two similar frame members 2 and 3, united above by means of the handle 1 and strengthened intermediately by means of the braces 4, 5, and 6, as shown.

Revolubly held within the braces 5 and 6 is a hollow shaft 8, to the upper end of which is secured a worm-gear $b$ and to the lower end of which is secured a head 12, the worm-gear preventing the hollow shaft from working downward and the head 12 from working upward.

Secured to the side of the members 2 and 3 are the bearings 14, supporting the shaft 9, provided with the handle 16, and to this shaft 9 is secured a worm 10, as shown. Rotating this worm turns the worm-gear $b$ and revolves the head 12, to which are secured the arms 13 13, there being a plurality of these arms, and every other arm is provided with an inwardly-extending knife $f$ and the intermediate arms with an outwardly-extending knife $b$, as shown in Fig. 1 and 2.

At the lower ends the frame members 2 and 3 are provided with the pins $c$, so that the same may be forced into the earth.

Two of the arms 13 are connected by means of the cross-brace 14, provided with a central opening, through which extends the bar $a$, passing through the hollow shaft 8 and secured to the cross-head 4 above. This bar $a$ is stationary and below is provided with the shield 15, to be placed over the plants to be cultivated. Below the frame is further strengthened by means of the curved brace 15.

The operation of my device is as follows: The plants, such as beets, which are placed very close together, after a certain period of growth are thinned out, and the operator takes this tool and places the shields 15 at predetermined intervals over certain plants and turns the handle 16, so that all vegetation is cut by the inwardly and outwardly extending knives $e$, save only the plants held between the shields 15.

While this cultivator is especially adapted to be used in connection with the cultivation of beets, the same may be used in connection with any suitable vegetation, and,

Having thus described my said invention, what I claim as new, and desire to secure by United States Letters Patent, is—

1. The combination with a supporting-frame, of a shield supported by said frame, a shaft, a plurality of arms extending from said shaft, inwardly and outwardly extending knives secured to said arms and means to rotate said shaft.

2. The combination with a suitable portable frame, of a bar vertically held within said frame, a shield at the end of said frame, a hollow shaft surrounding said bar above, a plurality of arms extending from said hollow shaft, inwardly and outwardly extending knives secured to said arms, a worm-gear secured to said hollow shaft, a driving-shaft and a worm secured to said driving-shaft meshing with said worm-gear, all arranged substantially as and for the purpose set forth.

In testimony whereof I affix my signature in presence of two witnesses.

FREDERICK L. NOVOTNY.

Witnesses:
     JOHN STEEL,
     ETTA SMITH.